Figure 1:
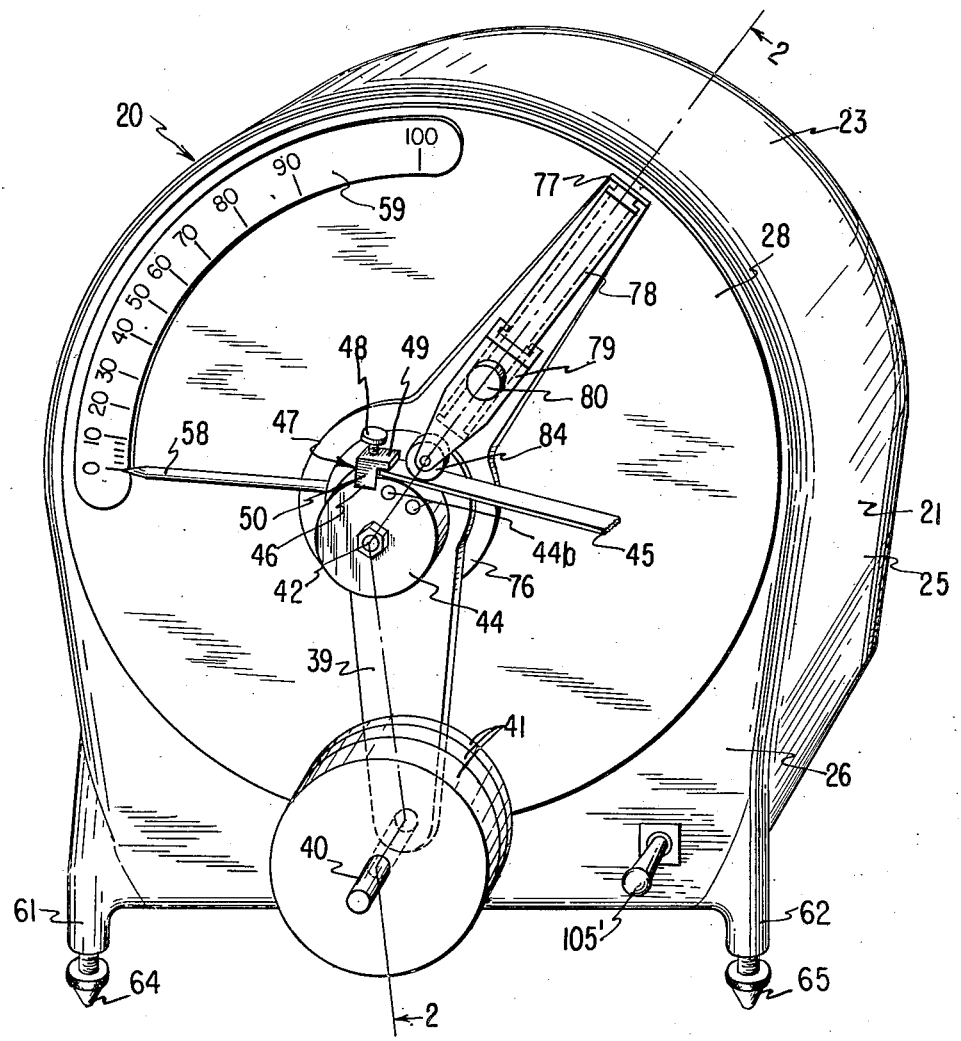

Nov. 7, 1950　　　　G. STANIUS　　　2,528,918
FLEXURE TESTING APPARATUS

Filed May 24, 1947　　　　　　　　5 Sheets-Sheet 1

Inventor
Godfrey Stanius
By
Smith, Olsen & Baird
Attorneys

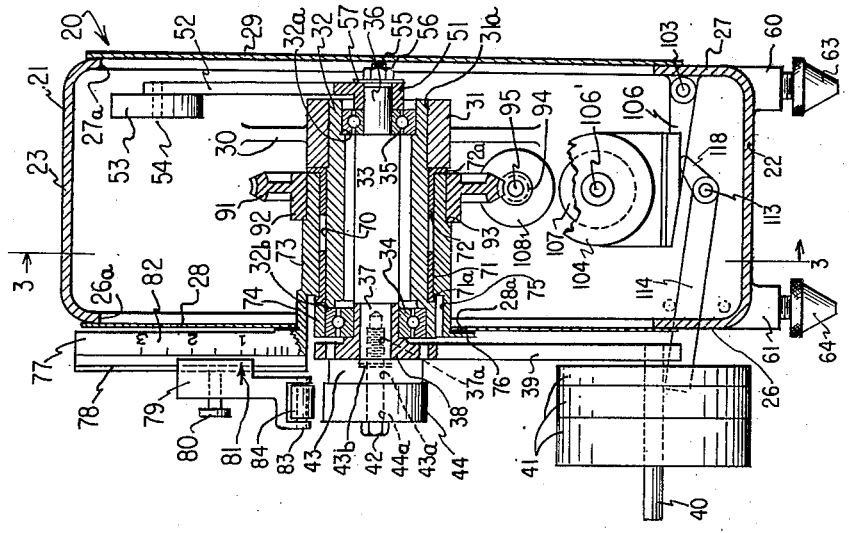

Inventor
Godfrey Stanius
By Smith, Olsen & Baird
Attorneys

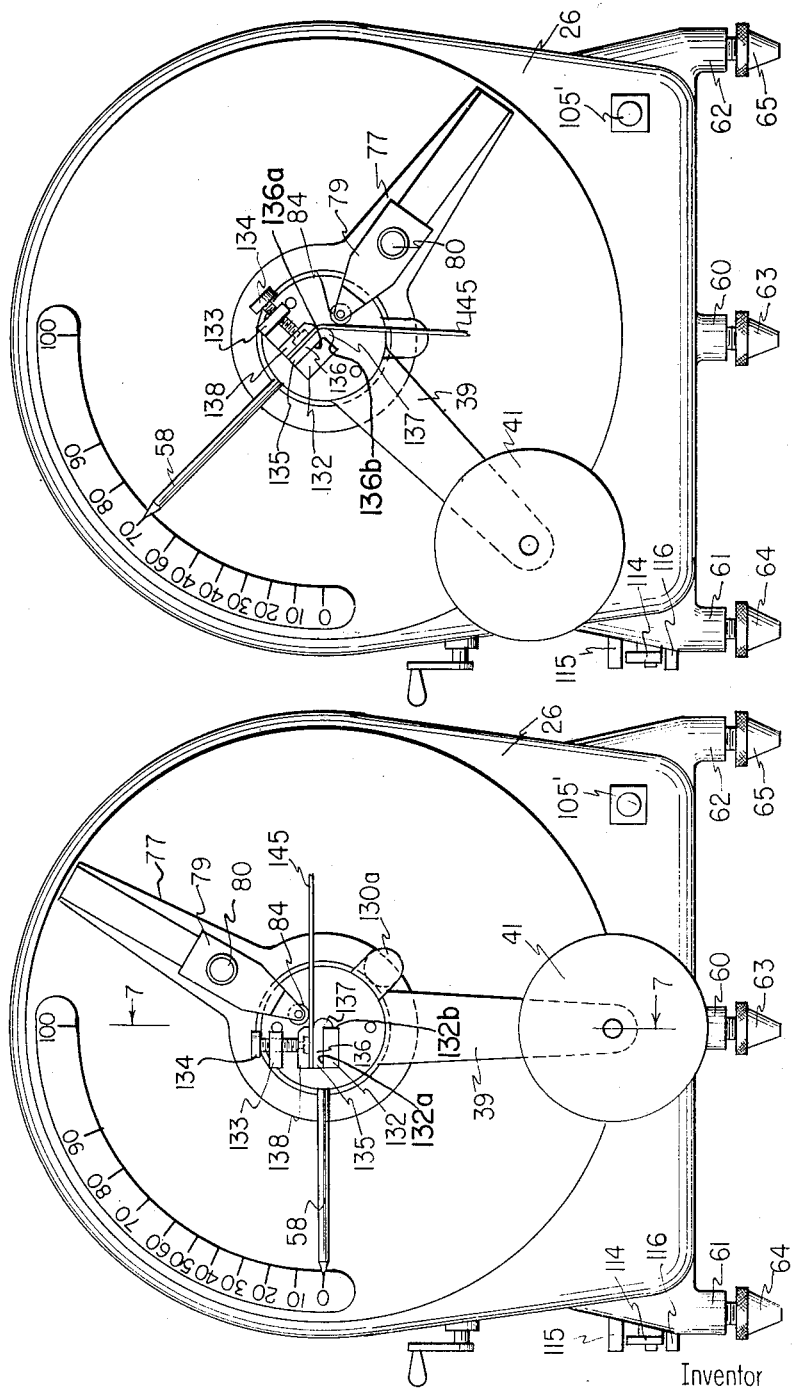

Chart for Bending Load

Chart for Critical Bending Radius ($R_{ic}$)

Inventor
Godfrey Stanius

Patented Nov. 7, 1950

2,528,918

UNITED STATES PATENT OFFICE 2,528,918

FLEXURE TESTING APPARATUS

Godfrey Stanius, Chicago, Ill.

Application May 24, 1947, Serial No. 750,312

4 Claims. (Cl. 73—100)

The present invention relates to machines for measuring flexural moments, and more particularly to such machines that permit of direct and straight-forward calculations, from the data obtained, of the yield point on the stress-strain diagram in flexure and of the strain hardening portion of the stress-strain diagram in flexure.

In the manufacture of metal products from fairly thin gauge cold-worked sheet and strip stock, such, for example, as low carbon steels and aluminum alloys, it is highly desirable to know quite accurately the stress-strain diagram of the materials.

In a conventional flexure testing machine, substantially straight test specimens are deformed or bent through approximately 90° over the sharp edge of a square jaw; and the flexural or bending moments to produce these deformations are measured. From such data comparative flexural characteristics of the material of the test specimens may be obtained, but the determinations, from given test specimens of a particular material, of the yield point on the stress-strain diagram in flexure and of the strain-hardening portion of the stress-strain diagram in flexure are largely conjectural. This situation follows from the primary circumstance that reproducible results cannot be obtained from such a conventional flexure testing machine of the type noted utilizing identical test specimens from the same sheet of stock of the material undergoing test, employing the same set-up of the machine in repeated tests utilizing the test specimens mentioned.

Perhaps the principal fault in the conventional machine of the type noted that brings about the undesirable results mentioned resides in the utilization therein of a square jaw having a sharp edge over which the test specimens are deformed or bent, as it is not believed that two identical test specimens are deformed in precisely the same manner or exactly to the same configuration incident to two successive operations of the same machine employing the same square jaw. Moreover, another fundamental difficulty is encountered in the calculations utilizing the data obtained from such a machine, as it is impossible to subject to rigorous analysis the stress-strain factors involved when a test specimen is being deformed or bent through such a sharp angle as 90° over the sharp edge of the square jaw; whereby the formulas derived and employed in the calculations mentioned are largely empirical.

Accordingly, it is an object of the invention to provide a machine for measuring flexural moments exerted upon test specimens, which machine operates upon principles capable of straightforward rigorous analysis with respect to the stress-strain factors involved while the test specimens are undergoing deformation so that simple formulas may be derived permitting straightforward and direct calculations of the yield point on the stress-strain diagram in flexure and of the strain hardening portion of the stress-strain diagram in flexure of the material undergoing test.

A further object of the invention is to provide an improved flexure testing machine that permits of the determination of the precise values of the yield point on the stress-strain diagram in flexure and of the strain hardening portion of the stress-strain diagram in flexure of a material undergoing test.

A still further object of the invention is to provide a flexure testing machine of simple construction and arrangement that is capable of measuring the stress-strain characteristics in flexure of a wide variety of materials of different gauges in a simple and ready manner.

Further features of the invention pertain to the particular arrangement of the elements of the machine and the sequence of the steps of the method; whereby the above outlined and additional features thereof are attained.

Figure 4:
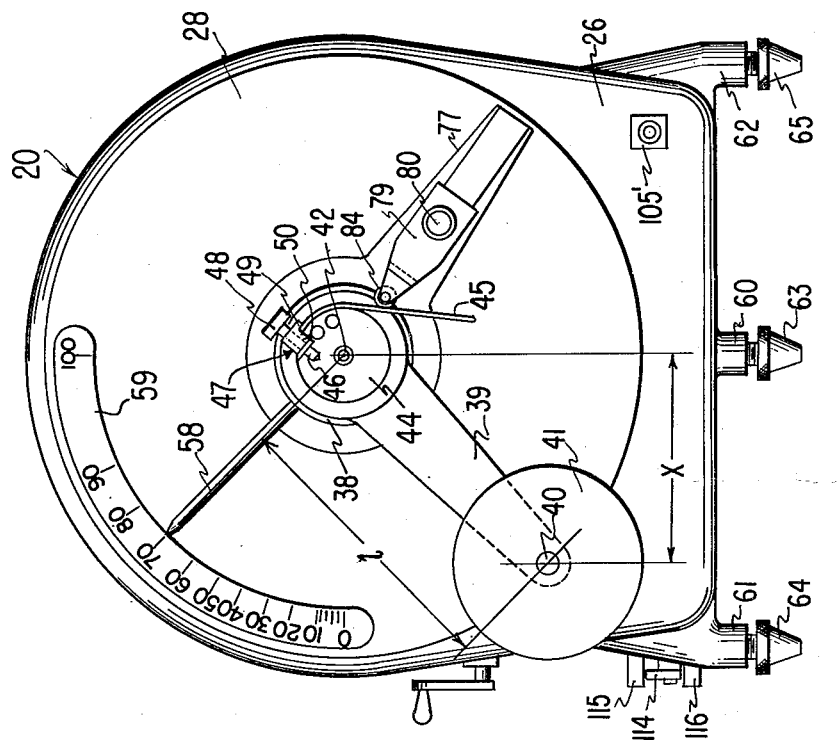
Figure 8:
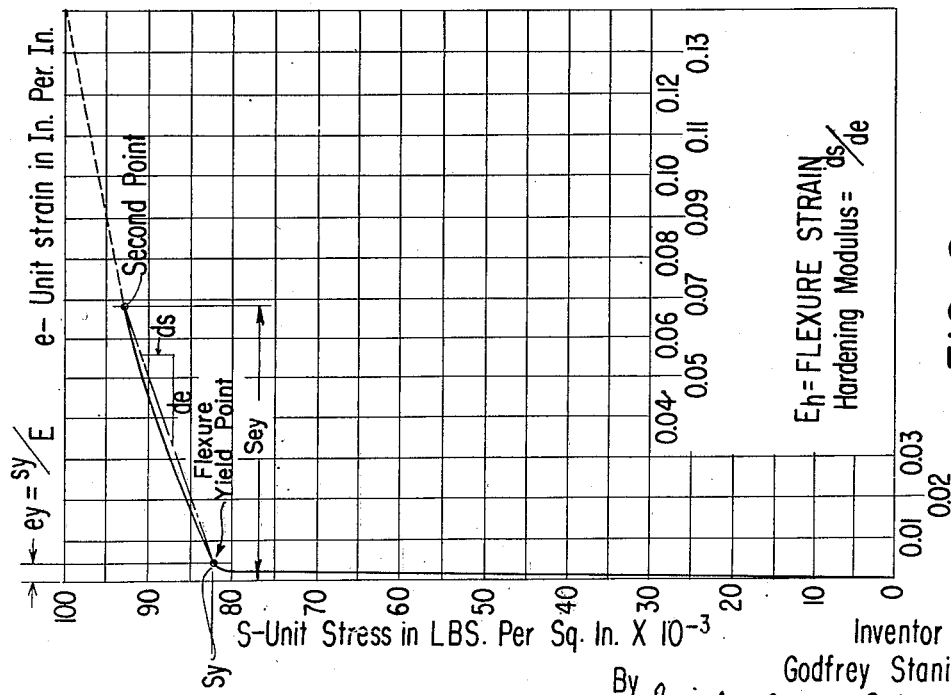
Figure 9:
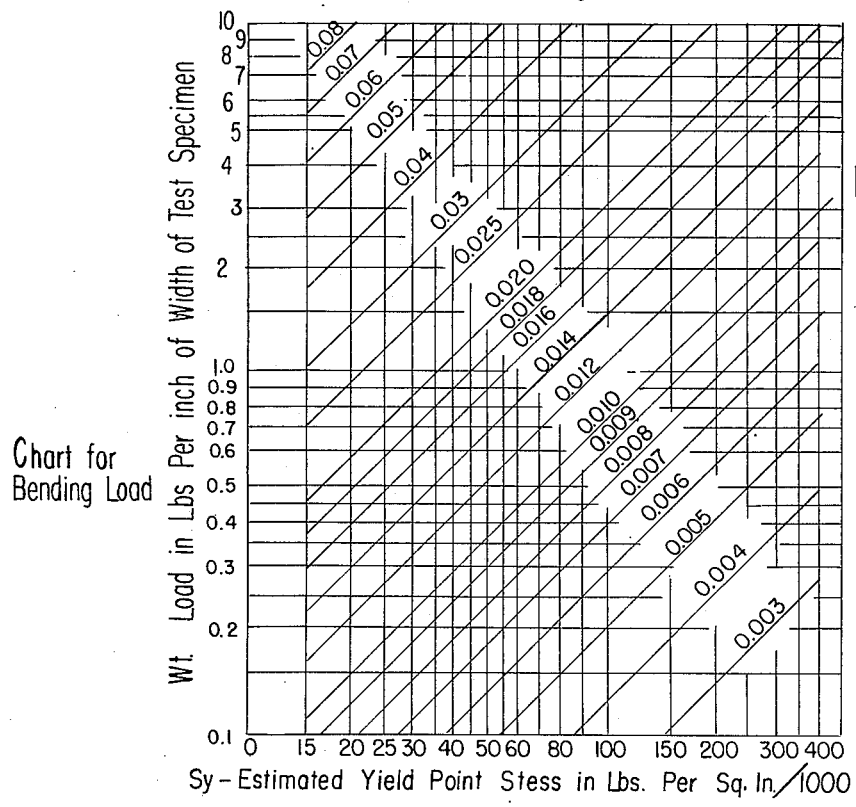
Figure 10:
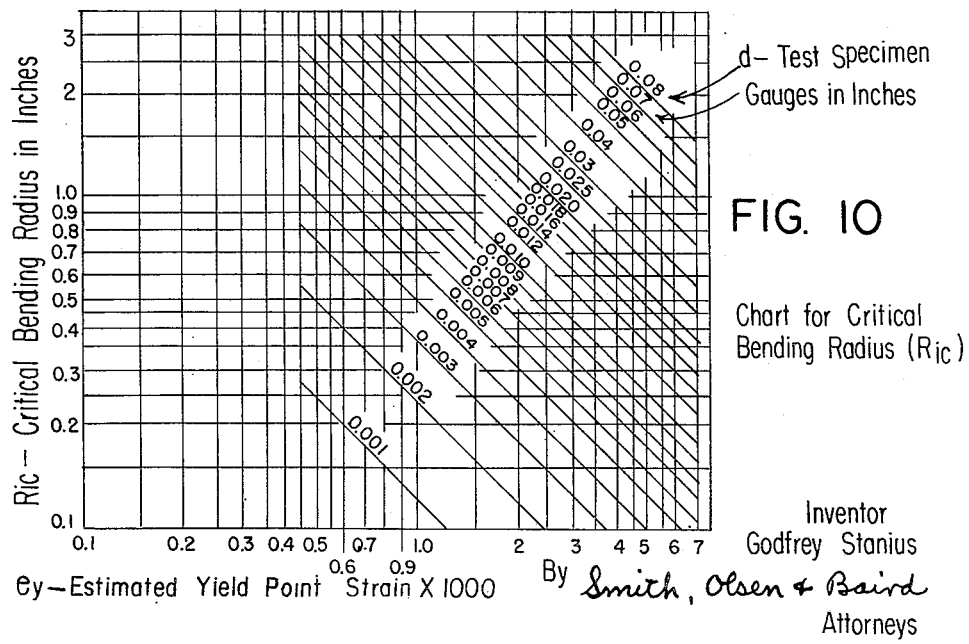

The invention, both as to its organization and method of operation, together with further objects and advantages thereof, will best be understood by reference to the following specification taken in connection with the accompanying drawings, in which Figure 1 is a perspective view of a flexure testing machine, incorporating a first type of bending arbor, and illustrating certain parts thereof in their normal positions, and embodying the features of the present invention, and which is utilized in carrying out the method of the present invention; Fig. 2 is a sectional view of the machine, taken along the line 2—2 in Fig. 1 in the direction of the arrows indicated; Fig. 3 is a sectional view of the machine, taken along the line 3—3 in Fig. 2 in the direction of the arrows indicated; Fig. 4 is a front elevational view of the machine, incorporating the first type of bending arbor, and illustrating the parts mentioned thereof in their fully operated positions; Fig. 5 is a front elevational view of the machine, incorporating a second type of bending arbor, and illustrating certain parts thereof in their normal positions; Fig. 6 is a front elevational view of the machine, incorporating the second type of bending arbor, and illustrating the parts mentioned thereof in their fully operated positions; Fig. 7 is a fragmentary sectional view of the front portion of the machine, incorporating the second type of bending arbor, taken along the line 7—7 in Fig. 5 in the direction of the arrows indicated; Fig. 8 is a stress-strain diagram that has been plotted from certain calculations produced from data obtained incident to operation of the machine utilizing initially a bending arbor of the first type, illustrated in Fig. 1, and utilizing subsequently a bending arbor of the second type, illustrated in Fig. 5; Fig. 9 is a bending load chart, illustrating the relationship between different gauges of test specimen, estimated yield point stresses, and weights that should be employed in the machine, utilizing the first type of bending arbor of Fig. 1 and Fig. 10 is a critical bending radius chart, illustrating the relationship between different gauges of test specimen, estimated yield point strains, and critical bending radii of the first type of bending arbor of Fig. 1 that should be employed in the machine.

Referring now more particularly to Figs. 1 to 4, inclusive, of the drawings, the flexure testing machine 20 there illustrated comprises a housing in the form of a hollow shell 21, preferably cast from aluminum, iron or other suitable material, and provided with a substantial horizontal bottom wall 22, a substantially semi-cylindrical top wall 23, substantially vertical connecting side walls 24 and 25, and substantially vertical front and rear walls 26 and 27. The front and rear walls 26 and 27 have large, annular, substantially centrally disposed openings 26a and 27a respectively formed therein; which openings 26a and 27a are covered by front and rear cover plates 28 and 29 respectively removably secured to the exterior surfaces of the adjacent front and rear walls 26 and 27 in any suitable manner. Within the hollow shell 21 and preferably formed integrally therewith, is a supporting web structure 30 terminating in a substantially centrally disposed annular boss 31 having a central annular opening 31a formed therein, into which there is pressed a tubular support 32. The tubular support 32 is rigidly fixed within the central opening 31a formed in the boss 31 and projects transversely through the central portion of the shell 21. The rear end of the tubular support 32 terminates adjacent to but in spaced-apart relation with the rear wall 27 of the shell 21; while the front end of the tubular support 32 projects through the opening 26a formed in the front wall 26 of the shell 21 and through a centrally disposed opening 28a formed in the front cover plate 28. A centrally disposed shaft or arbor 33 is arranged within the tubular support 32 and supported by front and rear anti-friction bearings 34 and 35 of the ball bearing type. More particularly, the rear end of the shaft 33 terminates in a cylindrical hub 36 that frictionally engages the inner race of the anti-friction bearing 35; while the outer race of the anti-friction bearing 35 frictionally engages a counterbore 32a formed in the rear end of the tubular support 32. Similarly, the front end of the shaft 33 terminates in a hub 37 that frictionally engages a substantially cylindrical collar 38 terminating in a radially and downwardly extending arm 39. The rear end of the collar 38 is provided with a cylindrical bearing surface that frictionally engages the inner race of the anti-friction bearing 34; while the outer race of the anti-friction bearing 34 frictionally engages a counterbore 32b formed in the front end of the tubular support 32.

The extreme lower end of the arm 39 carries a forwardly projecting pin 40 that is adapted removably to support a plurality of substantially cylindrical and adjustable weights 41 having centrally disposed openings formed therein; whereby the individual weights 41 may be readily racked upon the pin 40 in side-by-side relation. A set of individual weights 41 of different predetermined masses is provided, which individual weights are utilized in conjunction with the machine 20 in a manner more fully explained hereinafter.

The extreme front end of the hub 37 formed on the shaft 33 projects through the collar 38 and has a threaded opening 37a formed therein which is adapted removably to receive the threaded shank of a bolt 42. Between the head of the bolt 42 and the collar 38 are removably secured in place a substantially cylindrical clamping element 43 and a bending arbor 44 of a first type. More particularly, the clamping element 43 has a centrally disposed opening 43a formed therein, through which the shank of the bolt 42 passes; which opening 43a terminates in a counterbore 43b receiving the extreme front end of the hub 37. Likewise, the bending arbor 44 has a centrally disposed opening 44a formed therein, through which the shank of the bolt 42 passes. Accordingly, the bolt 42 securely and rigidly clamps the collar 38 on the hub 37 of the shaft 33, and secures the clamping element 43 between the collar 38 and the bending arbor 44. Finally, the head of the bolt 42 securely clamps the bending arbor 44 against the clamping element 43. The bending arbor 44 comprises a substantially cylindrical outer surface of a predetermined radius and of appreciable width in order to accommodate the bending thereabout of a test specimen 45 of a corresponding width. A transverse and radially extending slot 46 is formed in the outer cylindrical surface of the bending arbor 44 that receives a clamping fixture 47 carrying a threaded screw 48. More particularly, the clamping fixture 47 is substantially inverted L-shape in vertical cross section providing a clamping jaw 49 and a stem or body portion 50. The stem 50 of the clamping fixture 47 is arranged in the slot 46 formed in the bending arbor 44 and is secured in place by the screw 48, the shank of the screw 48 extending through a radially extending opening formed in the stem 50 of the clamping fixture 47, and the end of the shank of the screw 48 being threaded into an opening, not shown, formed in the bottom of the slot 46 and extending into the body of the bending arbor 44. The inner end of the test specimen 45 is arranged between the clamping jaw 49 of the clamping fixture 47 and the adjacent cylindrical outer surface of the bending arbor 44 and securely clamped in place therebetween by tightening the screw 48. Since the slot 46 is formed in the cylindrical surface of the bending arbor 44 on the left-hand side of the vertical center line of the shaft 33, a number of holes 44b are bored in the front surface of the bending arbor 44 on the right-hand side of the vertical center line of the shaft 33 so that the bending arbor 44 will balance about the vertical center line of the shaft 33 when the clamping fixture 47 is secured in place. A set of individual bending arbors 44 of the first type and a corresponding set of clamping elements 43 are provided, the individual bending arbors 44 of the first type having different predetermined radii, and the individual clamping elements 43 being utilized in securing the corresponding bending arbors 44 of the first type in place on the front end of the shaft 33; which individual bending arbors 44 of the first type are utilized in conjunction with the machine 20 in a manner more fully explained hereinafter.

The extreme rear end of the hub 36 formed on the shaft 33 frictionally engages a substantially cylindrical collar 51 terminating in a radially and upwardly extending arm 52. To the extreme upper end of the arm 52 there is secured a counterweight 53 by a rivet 54; which counterweight 53 maintains the shaft 33 and the parts secured thereto in normal balance. The final extremity of the hub 36 provided on the rear end of the shaft 33 terminates in a threaded shank 55 which receives a nut 56 in order securely to clamp the collar 51 in place on the hub 36, a washer 57 being disposed between the nut 56 and the adjacent surface of the collar 51. Also an index pointer 58 is provided, the inner end of which being rigidly secured to the collar 38; and the outer end of the index pointer 58 cooperates with an arcuate indicia plate 59 secured to the outer face of the front cover plate 28. The bottom and rear walls 22 and 27 of the shell 21 terminate in a centrally disposed and downwardly extending boss 60; while the bottom wall 22 and the connecting side walls 24 and 25 respectively terminate in downwardly extending bosses 61 and 62. Thus, the boss 60 is disposed adjacent to the center and to the rear of the shell 21; and the boses 61 and 62 are disposed adjacent to the front and respectively on the left-hand and on the right-hand sides of the shell 21. The bosses 60, 61 and 62 respectively carry independently adjustable feet 63, 64 and 65; whereby the shell 21 is supported upon a tripod. More particularly, each foot 63, etc., is provided with a threaded shank that is received in an associated threaded opening formed in the corresponding boss 60, etc.; whereby the shell 21 may be initially leveled in order to cause the extreme outer end of the index pointer 58 carried by the collar 38 to point to the figure "0" on the indicia plate 59 after the inner end of the test specimen 45 has been clamped to the bending arbor 44 by the clamping fixture 47.

The central portion of the tubular support 32 comprises a bearing surface 70 that carries front and rear frictionally engaging sleeve bearings 71 and 72, respectively, that commonly carry a rotatably mounted tubular element 73 surrounding the tubular support 32. The extreme front end of the tubular support 32 terminates in a cylindrical flange 74 that projects outwardly beyond the centrally disposed bearing surface 70 formed thereon and into a counterbore 75 formed in the front end of the tubular element 73. The front end of the sleeve bearing 71 terminates in an outwardly projecting flange 71a extending between the adjacent shoulder formed in the bottom of the counterbore 75 provided in the tubular element 73 and the adjacent shoulder formed on the flange 74 provided on the tubular support 32; thereby to prevent lateral movement of the tubular element 73 toward the front of the machine 20 and out of the shell 21. Similarly, the rear end of the sleeve bearing 72 terminates in an outwardly projecting flange 72a extending between the rear end of the tubular element 73 and the adjacent surface of the annular boss 31; thereby to prevent lateral movement of the tubular element 73 toward the rear wall 27 of the shell 21.

Accordingly, the tubular element 73 is mounted on the outer bearing surface 70 of the tubular support 32 by the sleeve bearings 71 and 72 for free rotary movement, but is restrained by the sleeve bearings 71 and 72 against lateral movements within the shell 21.

The front end of the tubular element 73 also projects through the opening 28a formed in the front cover plate 28 and terminates in an outwardly directed annular flange 76, that, in turn, terminates into a normally upwardly extending bending arm 77. The bending arm 77 carries a guide rail 78 that slideably supports a bracket 79 provided with a clamping screw 80; whereby the bracket 79 may be clamped by the clamping screw 80 rigidly to the bending arm 77 in any desired adjusted position along the guide rail 78. The bracket 79 carries an index marker 81 that cooperates with an indicia scale 82 provided on the adjacent surface of the bending arm 77. Finally, the inner end of the bracket 79 is bifurcated to provide two spaced-apart arms that rigidly support a pin 83 upon which a roller 84 is mounted for rotation. The dimensions of the bracket 79 are coordinated with respect to the index marker 81 carried thereby, and the indicia scale 82 carried on the adjacent surface of the bending arm 77, so that the distance between the lower surface of the roller 84 and the center of the shaft 33, and consequently the center of the bending arbor 44, may be read directly in inches from the indicia scale 82 against the position of the index marker 81.

In view of the foregoing, it will be understood that when the tubular element 73 is rotated in the clockwise direction, as viewed in Figs. 1 and 4, upon the tubular support 32, the bending arm 77 is rotated therewith carrying the bracket 79 supporting the roller 84, whereby the roller 84 is rotated with respect to the cylindrical outer surface of the bending arbor 44. At this time, in the event the inner end of the test specimen 45 is clamped between the clamping jaw 49 of the clamping fixture 47 and the associated cylindrical surface of the bending arbor 44, the roller 84 engages the immediately adjacent section of the test specimen 45 exerting a flexural or bending moment thereon; whereby the test specimen 45 exerts a torque through the bending arbor 44 upon the shaft 33 causing it to rotate in the clockwise direction on the anti-friction bearings 34 and 35 with respect to the tubular support 32. As the shaft 33 is rotated in the clockwise direction with respect to the tubular support 32, the individual weights 41 are moved outwardly from the vertical center line of the machine 20 toward the left; and the index pointer 58 carried by the collar 38 moves in the clockwise direction over the associated indicia plate 59. As the individual weights 41 are moved outwardly toward the left, they exert a countertorque in the counterclockwise direction upon the shaft 33, and consequently upon the bending arbor 44, which is transmitted through the test specimen 45 to the roller 84 carried by the bracket 79 supported by the bending arm 77. Specifically, the individual weights 41, as they move outwardly toward the left, exert a weighing action upon the test specimen 45 that is a measure of the flexural or bending moment exerted upon the test specimen 45, and is indicated by the index pointer 58 with reference to the indicia plate 59. Of course, as the flexural or bending moment exerted upon the test specimen 45 is gradually increased, with continued rotation of the bending arm 77 in the clockwise direction, the bending in the test specimen 45 increases, since stress is proportional to strain before the yield point is reached; whereby the portion of the test specimen 45 adjacent to the clamping fixture 47 is deformed or bent to the conformity of the cylindrical outer surface of the bending arbor 44 throughout a considerable arc thereof by the time the index pointer 58 has reached a maximum and approximately midscale, reading about 70, with respect to the associated indicia plate 59.

The machine 20 further comprises a worm gear 91 terminating in a cylindrical hub 92 that is rigidly secured to a reduced shank 93 formed on the extreme rear end of the tubular element 73; the worm gear 91 cooperates with an associated worm 94 carried by a shaft 95 suported in bearings 96, 97 and 98. The bearings 96 and 97 are carried by the web structure 30; while the bearing 98 is carried by the side wall 24 of the shell 21. The extreme left-hand end of the shaft 95 projects through the side wall 24 and terminates in a handcrank 99. The rear wall 27 of the shell 21 carries two spaced-apart bearings 101 and 102 rotatably supporting a shaft 103 that is rigidly secured to the base of an electric motor 104 by two lugs 105 and 106 depending therefrom. The electric motor 104 is of conventional construction and is provided with an electric circuit, not shown, that includes a snap switch 105' carried by the front wall 26 of the shell 21. Also, the electric motor 104 comprises a rotatable shaft 106' to which there is rigidly secured a friction wheel 107 that cooperates with a friction wheel 108 rigidly secured to the shaft 95. Also, the rear wall 27 carries a bearing 111 that is arranged in alignment with a bearing 112 also carried by the side wall 24; which bearings 111 and 112 rotatably support a shaft 113. The extreme left-hand end of the shaft 113 projects through the side wall 24 and has a forward extending lever 114 rigidly secured thereto; which lever 114 may be pivoted from an upper normal position determined by an outwardly projecting stop 115 carried by the side wall 24 to an operated lower position determined by an outwardly projecting stop 116 carried by the side wall 24. A collar 117 is rigidly secured to the shaft 113 and terminates in a lever 118 engaging the base of the electric motor 104.

As best shown in Figs. 2 and 3, the electric motor 104 is disposed substantially centrally within the shell 21 between the front and rear walls 26 and 27 thereof; whereby the weight of the electric motor 104 causes it to rotate in the counterclockwise direction, as viewed in Fig. 2, upon the lugs 105 and 106 secured to the shaft 103 toward the bottom wall 22 of the shell 21. Specifically, the weight of the electric motor 104 causes rotation of the shaft 103 in the counterclockwise direction, as viewed in Fig. 2, with respect to the supporting bearings 101 and 102; whereby the friction wheel 107 carried by the shaft 106' of the electric motor 104 is moved downwardly away from the friction wheel 108 carried by the shaft 95. The base of the electric motor 104 engages the lever 118 rotating the shaft 113 in the clockwise direction, as viewed in Fig. 2, in the supporting bearings 111 and 112; whereby the lever 114 is rotated with the shaft 113 in the clockwise direction into engagement with the upper stop 115.

In view of the foregoing description, it will be understood that the shaft 95 may be rotated in its supporting bearings 96, 97 and 98 utilizing the externally located handcrank 99; whereby the worm 94 rigidly secured to the shaft 95 effects corresponding rotation of the engaged worm wheel 91; thereby to effect corresponding rotation of the tubular element 73 and the connected bending arm 77. Also the shaft 95 may be rotated by the electric motor 104 as it will be understood that when the snap switch 105' is operated to its closed position, the circuit of the electric motor 104 is closed causing the shaft 106' thereof to rotate; whereby the friction wheel 107 rigidly secured to the shaft 106' rotates therewith. At this time when the lever 114 is moved from its upper normal position, as determined by the upper stop 115, to its operated lower position, as determined by the lower stop 116, the shaft 113 is rotated in the counterclockwise direction, as viewed in Fig. 2; whereby the lever 118 rotating in the counterclockwise direction urges the base of the electric motor 104 upwardly; whereby the electric motor 104 is moved upwardly rotating the supporting shaft 103 in the clockwise direction, as viewed in Fig. 2. As the shaft 103 is rotated in the clockwise direction, the electric motor 104 is moved upwardly; whereby the friction wheel 107 carried by the shaft 106' thereof engages the friction wheel 108 carried by the shaft 95; whereby the bending arm 77 is rotated in the clockwise direction as viewed in Fig. 1 in order to exert a flexural or bending moment upon the test specimen 45 in the manner previously explained.

Subsequently, when the lever 114 is released, it is moved from its lower operated position, as determined by the lower stop 116, to its upper normal position, as determined by the upper stop 115, by virtue of the weight of the electric motor 104 in the manner previously explained; whereby the electric motor 104 is moved downwardly causing the friction wheel 107 carried by the shaft 106' thereof to disengage the friction wheel 108 carried by the shaft 95. Subsequently, the shaft 95 may be rotated by the externally disposed handcrank 99 in order to cause the bending arm 77 to be returned to its normal position indicated by the index pointer 58 cooperating with the indicia plate 59. At this time the test specimen 45 may be removed by unloosening the screw 48 carried by the clamping fixture 47.

Referring now more particularly to Figs. 5 to 7, inclusive, of the drawings, the machine 20 comprises a second type of bending arbor structure that comprises a substantial cylindrical clamping element 130 that is provided with a substantially centrally disposed counterbore 130a formed therein, adapted to receive the extreme front end of the hub 37 formed on the shaft 33; which clamping element 130 has diametrically disposed openings 130b formed therein, through which two screws 131 extend, the threaded shanks of the screws 131 being received in corresponding aligned openings 38a formed in the collar 38. Accordingly, the clamping element 130 may be rigidly secured to the front end of the hub 37 directly to the collar 38, the collar 38 frictionally engaging the hub 37 as previously noted. Also the clamping element 130 carries a forwardly projecting base 132 that is substantially rectangular in vertical cross section; which base 132 is arranged in the lower left-hand quadrant of the clamping element 130 as clearly shown in Fig. 5. Specifically the base 132 comprises surfaces 132a and 132b disposed at an angle of approximately 90 degrees with respect to each other and intersecting at the center of the clamping element 130. Further the clamping element 130 carries a forwardly projecting lug 133 positioned above the base 132 and arranged in the upper left-hand quadrant thereof; which lug 133 has a threaded opening formed therein, into which there is positioned a clamping screw 134. Also, a bending arbor 135 is provided that comprises an elongated body portion 136 terminating in a semi-cylindrical outer surface 137 having a predetermined radius. Specifically the body portion 136 of the bending arbor 135 comprises surfaces 136a and 136b disposed at an angle of approximately 90 degrees with respect to each other. The center of the outer surface 37 of the bending arbor 135 coincides with the upper right-hand corner of the base 132; whereby the cylindrical outer surface 137 of the bending arbor 135 is disposed along the center line of the hub 37, and consequently along the center line of the shaft 33. Specifically the surfaces 136a and 136b on the body portion 136 of the bending arbor 135 respectively engage the surfaces 132a and 132b on the base 132. Further, a clamping plate 138 is disposed above the body portion 136 of the bending arbor 135 and in engagement with the extreme lower end of the clamping screw 134. The inner end of a test specimen 145 may be securely clamped in place by the lower surface of the clamping plate 138 and the upper surface of the body portion of the bending arbor 135. A set of individual bending arbors 135 of the second type is provided, the individual bending arbors 135 of the second type having cylindrical outer surfaces of different radii; and which individual bending arbors 135 of the second type are utilized in conjunction with the machine 20 in a manner more fully explained hereinafter.

Finally, a counterweight 130a is provided on the clamping plate 130 and projects outwardly therefrom along a line disposed substantially diametrically opposite from the base 132, the bending arbor 135 of the second type, the clamping plate 138, the lug 133 and the screw 134 in order to insure that the clamping plate 130 and the elements mentioned carried thereby, normally balance about the vertical center line of the machine 20.

In view of the foregoing description, it will be understood that when the bending arm 77 is rotated in the clockwise direction about the tubular support 32 in the manner previously explained, the roller 84 carried by the fixture 79 secured thereto effects bending of the test specimen 145 about the cylindrical outer surface 137 of the bending arbor 135 of the second type as a result of the flexural or bending moment exerted upon the test specimen 145; whereby the individual weights 41 are moved outwardly toward the left away from the vertical center line of the shaft 33 causing the index pointer 58 to register a maximum and approximately midscale reading, about 70, upon the associated indicia plate 59 when the adjacent portion of the test specimen 145 has been bent through a considerable arc of the cylindrical outer surface 137 of the bending arbor 135 of the second type.

The details of operation of the machine 20 will be better understood from the following description of the method of the present invention and in conjunction with which the charts of Figs. 9 and 10 are utilized; whereby data obtained incident to operation of the machine 20 is employed to produce certain calculations that, in turn, permit the plotting of the stress-strain diagram shown in Fig. 8.

First, specimens are cut from the sheet stock utilizing a die or the like; and preferably each specimen is rectangular both in plan and cross section. However, the method and the operation of the machine 20 are similar for specimens of round or any other uniform cross section. The specimens should be of uniform thickness or gauge; and after they are cut, the edges thereof are machined parallel and all burrs removed. The specimens should be reasonably flat and of a width at least six times the thickness or gauge. Also, the specimens should have a length considerably longer than the width thereof, as explained more fully below.

Considering now the operation of the machine 20 to perform the first test, data are obtained permitting the determination of the unit stress to the yield point in flexure, $s_y$, of the test specimen. First the critical bending radius of the bending arbor 44 of the first type should be established utilizing the chart of Fig. 10 of the drawings. Referring to the chart of Fig. 10, it will be observed that the abscissa thereof is plotted on a logarithmic scale in terms of $e_y$—estimated yield point strain $\times$ 1000; while the ordinate thereof is plotted on a logarithmic scale in terms of $R_{ic}$—critical bending radius in inches; a plurality of straight line curves being drawn on this chart and corresponding to different gauges, $d$, of test specimen in inches. More particularly, the yield point strain of the test specimen is estimated and applied along the abscissa of the chart of Fig. 10. A vertical line is then extended to the straight line curve corresponding to the gauge, $d$, in inches of the test specimen; then a horizontal line is extended to the ordinate of the chart of Fig. 10 to obtain a value for the critical bending radius, $R_{ic}$, in inches of the bending arbor 44 of the first type that should be employed in the machine 20 in performing the first test. This utilization of the chart of Fig. 10 insures that the first test performed by the machine 20 does not strain the test specimen beyond the yield point in flexure; and in passing it is noted that it is necessary to estimate the accuracy of the yield point strain of the test specimen only within limits of $\pm 25\%$ in order to obtain highly accurate results.

Next the weight, $W_t$, that should be assembled of the individual weights 41 and placed upon the pin 40 carried by the arm 39 in the machine 20 in performing the first test should be established utilizing the chart of Fig. 9 of the drawings. Referring to the chart of Fig. 9, it will be observed that the abscissa thereof is plotted on a logarithmic scale in terms of $s_y$—estimated yield point stress in lbs. per sq. in./1000; while the ordinate thereof is plotted on a logarithmic scale in terms of $W_t$—load in lbs. per in. of width of test specimen; a plurality of straight line curves being drawn on this chart and corresponding to different gauges, $d$, of the test specimen in inches. More particularly, the yield point stress of the test specimen is estimated and applied along the abscissa of the chart of Fig. 9. A vertical line is then extended to the straight line curve corresponding to the gauges, $d$, in inches of the test specimen; then a horizontal line is extended to the ordinate of the chart of Fig. 9 to obtain a value for the load, $W_t$, in lbs. of the individual weights 41 that are to be placed upon the pin 40 in the machine 20 in the first test. This utilization of the chart of Fig. 9 insures that in performing the first test in the machine 20 that the index pointer 58 carried by the collar 38 will produce as a maximum an approximate midscale reading, about 70, with respect to the associated indicia plate 59; which operation of the machine 20 produces most accurate results.

Having thus established the critical bending radius, $R_{ic}$, of the bending arbor 44 of the first type that is to be employed in performing the first test by the machine 20, a bending arbor 44 of the first type having the critical bending radius, $R_{ic}$, mentioned, is selected from the set of bending arbors 44 of the first type previously mentioned and assembled upon the front of the collar 38, together with the corresponding clamping plate 43. Also from the set of individual weights 41, selections are made to produce the total weight, $W_t$, that has been determined as previously explained; which individual weights 41 are then assembled upon the pin 40 carried by the arm 39 of the machine 20.

At this point it is noted that it is necessary to adjust the position of the roller 84 carried by the bracket 79 upon the bending arm 77 with reference to the cylindrical outer surface of the bending arbor 44 of the first type that has been assembled upon the collar 38. More particularly, the position of the roller 84 with respect to the cylindrical outer surface of the bending arbor 44 of the first type should bear a direct relationship with respect to the value of the critical bending radius, $R_{ic}$, of the bending arbor 44 of the first type in order to prevent initial binding through the test specimen 45 between the roller 84 and the bending arbor 44 of the first type as a result of the roller 84 being spaced too small a distance from the outer cylindrical surface of the bending arbor 44 of the first type; as well as to prevent undue lateral bending in the test specimen 45 as a result of the roller 84 being spaced too great a distance from the outer cylindrical surface of the bending arbor 44 of the first type. Also the minimum length of the test specimen should bear a predetermined relationship with respect to the distance of the roller 84 from the cylindrical outer surface of the bending arbor 44 of the first type in order to insure that the test specimen 45 is sufficiently long so that it may be deformed or bent to conform to a considerable arc of the outer cylindrical surface of the bending arbor 44 of the first type when the machine 20 has been operated in order to cause the index pointer 58 to produce as a maximum an approximate midscale reading with reference to the associated indicia plate 59.

The relationships between the critical bending radius, $R_{ic}$, in inches of the bending arbor 44 of the first type, the distance between the center line of the bending arbor 44 of the first type, and consequently the center line of the shaft 33, to the lower peripheral surface of the roller 84 in inches (hereinafter referred to as $l_1$), and the minimum length of the test specimen in inches in order to obtain best results, are indicated in the table below:

| $R_{ic}$ (in Ins.) | $l_1$ (in Ins.) | Minimum length of test specimen (in Ins.) |
|---|---|---|
| 1/16 | 0.082 | 1½ |
| 3/32 | 0.122 | 1½ |
| 1/8 | 0.164 | 1½ |
| 3/16 | 0.243 | 1½ |
| 1/4 | 0.322 | 2 |
| 3/8 | 0.484 | 2 |
| 1/2 | 0.645 | 2 |
| 3/4 | 0.956 | 2 |
| 1 | 1.275 | 3 |
| 1½ | 1.900 | 3 |
| 2 | 2.520 | 3 |
| 2½ | 3.155 | 3 |
| 3 | 3.781 | 4 |
| 4 | 5.045 | 5 |
| 5 | 6.310 | 5 |

The distance $l_1$ in inches between the center line of the bending arbor 44 of the first type and the lower peripheral surface of the roller 84 may be read directly by utilizing the marker 81 carried by the clamping bracket 79 and the indicia scale 82 provided on the bending arm 77. When the marker 81 carried by the clamping bracket 79 is brought to a reading upon the indicia scale 82 provided on the bending arm 77 corresponding to the distance, $l_1$, in inches, the screw 80 is tightened, securely retaining the clamping bracket 79 in its adjusted position upon the bending arm 77. Also the inner end of the test specimen 45 is inserted between the jaw 49 carried by the clamping fixture 47 and the adjacent cylindrical outer surface of the bending arbor 44 of the first type; whereupon the screw 49 is set in order securely to clamp in place the inner end of the test specimen 45. At this time, the crank 99 is adjusted, in the event this is necessary, in order to insure that the pin 40 is disposed along the vertical center line of the machine 20. Then the feet 63, 64 and 65 of the machine 20 are adjusted, in the event it is necessary, in order to insure that the index pointer 58 matches the figure "0" on the indicia plate 59 initially.

Then the snap switch 105' is operated in order to close the circuit of the electric motor 104 and the lever 114 is operated in the manner previously explained; whereby the bending arm 77 is rotated in the clockwise direction as viewed in Fig. 4, causing the test specimen 45 to be deformed or bent to conform to a considerable arc of the cylindrical outer surface of the bending arbor 44 of the first type. In view of the proper selection of the weight, $W_t$, comprising the assembled individual weights 41 on the pin 40, the index pointer 58 produces an approximate midscale reading with reference to the associated indicia plate 59 as a maximum reading. At this time the roller 84 begins bending the test specimen 45 freely about the cylindrical outer surface of the bending arbor 44 of the first type without producing any increased reading of the index pointer 58 with respect to the indicia plate 59. Accordingly, the maximum reading mentioned is noted; and the test is stopped by releasing the lever 114. Also, the snap switch 105' is returned to its open position; and the handcrank 99 is operated to return the pin 40 again to the vertical center line of the machine 20. At this time the clamping screw 48 may be loosened and the test specimen 45 removed.

Now considering the operation of the machine 20 to perform the second test, data are obtained permitting the determination of the flexure modulus of strain hardening, $E_h$, of the test specimen. The flexure modulus modulus of strain hardening, $E_h$, may be defined as the tangent of the average slope of the flexure stress-strain diagram beyond the flexure yield point, $e_y$, and in a stress range not exceeding 30 times the unit strain in flexure to the flexure yield point, $e_y$. This tangent is illustrated as $ds/de$ in the stress-strain diagram of Fig. 8.

In utilizing the machine 20 to perform the second test, a bending arbor 135 of the second type is employed that comprises an outer cylindrical surface 137 having a radius approximately ⅙ of the critical bending radius $R_{ic}$, of the bending arbor 44 of the first type that was employed in the first test utilizing the machine 20. Also, the total weight, comprising the individual weights 41, employed on the pin 40 is increased by approximately 20% over the weight, $W_t$, that was employed in performing the first test utilizing the machine 20. Hence, the bending arbor 44 of the first type and the associated clamping element 43 are removed from the collar 38; and the clamping plate 130 is substituted therefor. More particularly, the clamping plate 130 is secured to the collar 38 utilizing the screws 131; and the selected bending arbor 135 of the second type is placed upon the base 132. The inner end of the test specimen 145 is clamped between the upper surface of the body portion 136 and the associated clamping plate 138; and the clamping screw 134 is tightened securely clamping the inner end of the test specimen 145 in place. Also, the additional individual weights 41 are placed upon the pin 40 in order to produce a new load approximately 20% greater than the weight, $W_t$, employed in the first test utilizing the machine 20 as previously explained. Further, the position of the roller 84 with respect to the center line of the bending arbor 135 of the second type, and consequently the center line of the shaft 33, is again adjusted to the new value utilizing the table set forth above; and the clamping screw 80 is tightened in order securely to retain the clamping bracket 79 in place on the bending arm 77.

Utilizing the bending arbor 135 of the second type having the cylindrical outer surface 137 of approximately ⅙ of the critical bending radius, $R_{ic}$, of the bending arbor 44 of the first type positively insures that the second test performed by the machine 20 strains the test specimen well beyond the flexure yield point. Also, utilizing a load in performing the second test that is approximately 20% greater than the weight, $W_t$, employed in the first test, positively insures that the index pointer 58 carried by the collar 38 will produce as a maximum an approximate midscale reading with respect to the associated indicia plate 59; which operation of the machine 20 produces most accurate results.

The machine 20 is then operated in the manner previously explained; whereby the roller 84 deforms or bends the test specimen 145 to conform to a considerable arc of the cylindrical outer surface 137 of the bending arbor 135 of the second type; whereby the index pointer 58 produces as a maximum an approximate midscale reading with respect to the associated indicia plate 59; which maximum reading is noted. At this time the test is stopped by releasing the lever 114. Also, the snap switch 105′ is returned to its open position, and the handcrank 99 is operated to return the pin 40 again to the vertical center line of the machine 20. At this time the clamping screw 134 may be loosened and the test specimen 145 removed.

Before proceeding with the explanation of the manner in which the calculations are produced from the data obtained from the first and second tests utilizing the machine 20 in the manner explained above, the following glossary of stress-strain terminology is set forth:

$a$—thickness in inches of region surrounding neutral axis of test specimen which has not been stressed beyond the yield point.
$b$—width of test specimen in inches.
$d$—thickness or gauge of test specimen.
$e$—unit strain in flexure.
$e_o$—unit strain at outer fibers in flexure } Longitudinal to the test specimen
$e_y = s_y/E$—unit strain to yield point in flexure
$k_m = M_e/M_y$—bending moment ratio
$s$—unit stress in flexure } Longitudinal to the test specimen
$s_o$—unit stress at outer fibers in flexure
$s_y$—unit stress to the yield point in flexure
$D = 1000d$
$E$—modulus of elasticity by tensile test
$E_m = E/10^6$
$E_f$—modulus of elasticity in flexure (assumed equal to E)
$E_h$—modulus of average flexure strain-hardening in the strain range of 30 $e_y$.
$K_h = E_h/E$—strain hardening ratio in flexure
$M_e$—bending moment for plastic flexure in in.-lb.
$M_y$—bending moment to strain outer fibers to yield point in in.-lb.
$R_i$—radius on inside surface of bent test specimen in inches.
$R_o$—mean radius of bent test specimen.
$\delta = d/a = e_o/e_y$—deformation ratio Reconsidering the first and second tests performed by the machine 20 with reference to a particular example utilizing low carbon steel cold rolled strip having a Rockwell hardness number B=88.89 and a tensile modulus of elasticity $E=29.0 \times 10^6$; test specimens are first produced in the manner previously explained.

In connection with the first test performed by the machine 20, it is assumed that the thickness or gauge of a first test specimen, $d=0.0196$ in., that the width of the first test specimen, $b=0.625$ in.; that it is estimated that the yield point strain, $e_y=3.3 \times 10^{-3}$; and that it is estimated that the yield point stress, $s_y=95 \times 10^3$. Utilizing the estimated value $e_y=3.3 \times 10^{-3}$, in conjunction with the gauge, $d=0.0196$, in the chart of Fig. 10, it is established that the critical bending radius, $R_{ic}=0.750$; and utilizing the estimated value $s_y=95 \times 10^3$, in conjunction with the gauge, $d=0.0196$, in the chart of Fig. 9, it is established that the weight, $W_t=2.5$. Also, from the table set forth above, it will be apparent that utilizing a critical bending radius, $R_{ic}=0.750$ that the distance $l_1=0.956$ and that the minimum length of the test specimen should be 2 in.

Accordingly, the load, $W=W_t \times b=2.5 \times 0.625=1.5$ lbs., approx., comprising the individual weights 41 is placed upon the pin 40; the bending arbor 44 of the first type having a critical bending radius $R_{ic}$ of 0.750 in. is assembled upon the front end of the hub 37 of the machine 20; the clamping fixture 79 is adjusted with respect to the bending arm 77 so that $l_1=0.956$ obtained from the above table; and the inner end of the first test specimen 45 is clamped by the clamping fixture 47; all in the manner previously explained. Now assuming that when the machine 20 is operated to perform the first test, that the maximum reading of the index pointer 58 with respect to the associated indicia plate 59 is 65.5, that is hereinafter referred to as L, the reading produced by the index pointer 58 with respect to the associated indicia scale 59 during the first test.

Accordingly, at this time, all of the data necessary to calculate $s_y$, the unit stress to the yield point in flexure, has been obtained. More particularly, it has been determined that in the machine 20, $M_t=WlL/100b$; wherein $W$=weight of the load in lbs. (1.5 in the present example); $l$=distance of load W from the center line of the bending arbor 44 of the first type, the distance between the center line of the pin 40 and the center line of the bending arbor 44 of the first type (a constant of the machine 20); L=the reading produced by the index pointer 58 with respect to the indicia scale 59 (65.5 in the present example); and $b$=the width of the test specimen in inches (0.625 in the present example). In the particular machine 20, it follows that $M_t=0.04 WL/b$; which, utilizing the above data, may be solved: $M_t$ (when $b=l$) =6.28.

Also, it has been established in the machine 20 that:

$$e_0 = \frac{d}{2R_{ic}+d}$$

which may be solved: $e_o=0.01295$.

Further, it has been established that in the machine 20, $$s_y = \frac{10^6}{D^2/4.28 M_t - 0.82/e_0 E_m}$$

which may be solved: $s_y/1000=82.7$.

In connection with the second test performed by the machine 20, it is assumed that the thickness or gauge of a second test specimen, $d=0.0196$ in., and that the width of the second test specimen, $b=0.625$ in. Since the critical bending radius, $R_{ic}$, employed in the second test is equal to ⅙ of the critical bending radius, $R_{1c}$, employed in the first test, it follows that in the second test the critical bending radius, $R_{1c}$ = 0.125 in. Since the load W employed in the second test is approximately 120% of the weight, W, employed in the first test, it follows that in the second test, W=about 1.8 lbs.; and for convenience in the calculations, a value, W=2.0 lbs. is employed since this item is not critical in the second test as long as W is sufficiently great. Accordingly, a load W=2 lbs., comprising the individual weights 41 is placed upon the pin 40; the bending arbor 135 of the second type having a critical bending radius, $R_{1c}$, of 0.125 in. is placed upon the base 132 carried by the clamping plate 138 that, in turn, is assembled upon the front end of the hub 37 of the machine 20; the clamping fixture 79 is adjusted with respect to the bending arm 77 so that $l_1$=0.164 obtained from the above table; and the inner end of the first test specimen 145 is clamped in place between the body portion 136 of the bending arbor 135 of the second type and the clamping plate 138 by the clamping screw 134; all in the manner previously explained. Now assuming that when the machine 20 is operated to perform the second test, that the maximum reading of the index pointer 58 with respect to the associated indicia plate 59 is 56.3, that is hereinafter referred to as L, the reading produced by the index pointer 58 with respect to the associated indicia scale 59 during the second test.

Accordingly, at this time, all of the data necessary to calculate, $E_h$, the modulus of flexure strain hardening has been obtained. More particularly, it has been determined that in the machine 20, $M_t$=0.04 WL/b; wherein W=weight of load in lbs. (2.0 in the present example); L=the reading produced by the index pointer 58 with respect to the indicia scale 59 (56.3 in the present example); and b=the width of the test specimen in inches (0.625 in the present example). Solving: $M_t$ (when b=1) =7.22.

Also, it has been established that in the machine 20, $$a = \frac{s_y}{E}(2R_{ic}+d)$$

which may be solved: $a$=0.00077.

Further, it has been established that in the machine 20, $\delta$=d/a; which may be solved: $\delta$=24.8.

Also, it has been established that in the machine 20, $M_e$=1.12 $M_t$; which may be solved: $M_e$ (when b=1) =8.08.

Further, it has been established that in the machine 20, $M_y$=$s_y d^2$/6; which may be solved: $M_y$ (when b=1) =4.99.

Further, it has been established that in the machine 20, $k_m$=$M_e/M_y$; which may be solved: $k_m$=1.618.

Also, it has been established that in the machine 20, $$K_h = \frac{k_m - 1.5}{\delta - 1.5}$$

which may be solved: $K_h$=0.0050.

Finally, it has been established that in the machine 20, $E_h$=$EK_h$; which may be solved: $E_h$/1000=145.0.

Having performed the first and second tests utilizing the machine 20 to obtain the data previously described, and then having carried through the calculations as explained above, it has been established, in the particular example, that in the low carbon steel cold roller strip: $s_y$/1000=82.7 and that $E_h$/1000=145.0. Accordingly, from this data, the stress-strain diagram of Fig. 8 may be drawn.

Referring now more particularly to Fig. 8 of the drawings, it will be observed that the abscissa thereof is plotted on a linear scale in terms of e—unit strain in flexure in inch/inch; while the ordinate thereof is plotted on a linear scale in terms of s—unit stress in lbs. per sq. in.×$10^{-3}$.

More particularly, the flexure yield point on the stress-strain diagram of Fig. 8 is located where $e_y$=$s_y/E$=82.7×$10^3$/29.0×$10^6$=0.0028; and where $s_y$=82.7×$10^3$; which yield point is connected by a straight line to the "0" abscissa—"0" ordinate of the diagram. The second point on the strain hardening portion of the diagram is determined by applying along the abscissa the strain value, $\delta e_y$=24.8×0.0028=0.069; and then projecting a vertical line therefrom. A second line is then drawn from the flexure yield point at a slope corresponding to the value $E_h$/1000= ds/de=145/1000 into intersecting relationship with the first line mentioned; which intersection establishes the second point mentioned. Thus the second point mentioned is connected to the flexure yield point by the second line at the slope corresponding to the value of $E_h$/1000=145/1000.

The stress-strain diagram illustrated in Fig. 8 thus produced represents the flexure stress-strain values for the particular low carbon steel cold rolled strip that has been tested utilizing the machine 20. Actually, the diagram of Fig. 8 represents the average of the flexure stress-strain values for both tension and compression, since both of the latter items are involved in the flexure tests that have been performed utilizing the machine 20.

The fundamental principles of the present method permit a rational analysis and direct calculations of the values of $s_y$ and $E_h$ in the manner explained above; since the first test is performed by the machine 20 below the yield point in flexure of the test specimen and the second test is performed by the machine 20 beyond the yield point in flexure of the test specimen; each of which tests is performed by the machine 20 utilizing a bending arbor of known and predetermined radius. In other words the utilization of bending arbors of known and predetermined radii in the two tests performed by the machine 20 permit of the straightforward calculations and rationale of the operation of the machine 20. Moreover, the results obtained from the machine 20 are highly accurate and are capable of ready reproduction in an easy and rapid manner by persons not skilled in the technical aspects of strength of material measurements.

While there has been described what is at present considered to be the preferred embodiments of the invention, it will be understood that various modifications may be made therein; and it is intended to cover in the appended claims all such modifications as fall within the true spirit and scope of the invention.

What is claimed is:

1. A flexure testing machine comprising a support, first and second members carried by said support and mounted for independent and concentric rotation about the axis thereof, drive means for rotating said first member, a clamping plate, means for detachably securing said clamping plate to said second member for rotation about its center concentric with the axis of said support, a base carried by said plate and provided with first and second supporting surfaces disposed at a predetermined angle and intersecting at the center of said plate, an arbor including a body portion and a work engaging portion respectively provided with first and second supporting surfaces disposed at said predetermined angle and in intersecting relation, said work engaging portion being provided with a semicylindrical outer surface centered at the intersection of said second-mentioned first and second supporting surfaces, whereby said semicylindrical outer surface is concentric with the center of said plate when said arbor is supported by said base with said pairs of first and second supporting surfaces in respective engagement, means carried by said plate and adapted to engage a test specimen carried by said body portion for detachably clamping the test specimen and said arbor to said base, an arm carried by said first member and extending radially from the axis of said support, a bracket carried by said arm and movable therealong toward and away from the axis of said support, means for securing said bracket in any adjusted position along said arm, a roller carried by said bracket and adapted to engage and to exert a flexural moment upon the test specimen when said first member is rotated, whereby the test specimen effects rotation of said second member, weighing means for opposing rotation of said second member in order to render measurable the flexural moment exerted upon the test specimen and to cause it to be deformed substantially to conform to said semicylindrical outer surface of said arbor, and means for indicating the relative rotation between said second member and said support as an index of said measurable flexural moment exerted upon the test specimen.

2. A flexure testing machine comprising a support, first and second members carried by said support and mounted for independent and concentric rotation about the axis thereof, drive means for rotating said first member, a clamping plate, means for detachably securing said clamping plate to said second member for rotation about its center concentric with the axis of said support, a base carried by said plate and provided with first and second supporting surfaces disposed at a predetermined angle and intersecting at the center of said plate, an arbor including a body portion and a work engaging portion respectively provided with first and second supporting surfaces disposed at said predetermined angle and in intersecting relation, said work engaging portion being provided with a semicylindrical outer surface centered at the intersection of said second-mentioned first and second supporting surfaces, whereby said semicylindrical outer surface is concentric with the center of said plate when said arbor is supported by said base with said pairs of first and second supporting surfaces in respective engagement, means carried by said plate and adapted to engage a test specimen carried by said body portion for detachably clamping the test specimen and said arbor to said base, an arm carried by said first member and extending radially from the axis of said support, a bracket carried by said arm and movable therealong toward and away from the axis of said support, means for securing said bracket in any adjusted position along said arm, a roller carried by said bracket and adapted to engage and to exert a flexural moment upon the test specimen when said first member is rotated, whereby the test specimen effects rotation of said second member, means including parts respectively carried by said arm and by said bracket for indicating the distance between the axis of said support and the adjacent surface of said roller, weighing means for opposing rotation of said second member in order to render measurable the flexural moment exerted upon the test specimen and to cause it to be deformed substantially to conform to said semicylindrical outer surface of said arbor, and means for indicating the relative rotation between said second member and said support as an index of said measurable flexural moment exerted upon the test specimen.

3. A flexure testing machine comprising a housing having a front wall, a substantially centrally disposed transversely extending tubular support arranged within said housing, first and second members respectively mounted for relative rotation exteriorly and interiorly upon said tubular support and concentric with the axis thereof, the front ends of said first and second members projecting through a substantially centrally disposed opening formed in said front wall, drive means arranged within said housing for rotating said first member, a clamping plate, means for detachably securing said clamping plate to the front end of said second member exteriorly of said housing for rotation about its center concentric with the transverse axis of said tubular support, a base carried by said plate and provided with first and second supporting surfaces disposed at a predetermined angle and intersecting at the center of said plate, an arbor including a body portion and a work engaging portion respectively provided with first and second supporting surfaces disposed at said predetermined angle and in intersecting relation, said work engaging portion being provided with a semicylindrical outer surface centered at the intersection of said second-mentioned first and second supporting surfaces, whereby said semicylindrical outer surface is concentric with the center of said plate when said arbor is supported by said base with said pairs of first and second supporting surfaces in respective engagement, means carried by said plate and adapted to engage a test specimen carried by said body portion for detachably clamping the test specimen and said arbor to said base, an arm carried by the front end of said first member exteriorly of said housing and extending radially from the transverse axis of said tubular support, a bracket carried by said arm and movable therealong toward and away from the transverse axis of said tubular support, means for securing said bracket in any adjusted position along said arm, a roller carried by said bracket and adapted to engage and to exert a flexural moment upon the test specimen when said first member is rotated, whereby the test specimen effects rotation of said second member, means including parts respectively carried by said arm and by said bracket for indicating the distance between the transverse axis of said tubular support and the adjacent surface of said roller, weighing means disposed exteriorly of said housing and cooperating with said second member for opposing rotation thereof in order to render measurable the flexural moment exerted upon the test specimen and to cause it to be deformed substantially to conform to said semicylindrical outer surface of said arbor, and means including parts disposed exteriorly of said housing and respectively carried by said second member and by said front wall for indicating the relative rotation of said second member with respect to said tubular support as an index of said measurable flexural moment exerted upon the test specimen.

4. In a flexure testing machine, a clamping plate mounted for rotation about its center, a base carried by said plate and provided with first and second supporting surfaces disposed at a predetermined angle and intersecting at the center of said plate, an arbor including a body portion and a work-engaging portion respectively provided with first and second supporting surfaces disposed at said predetermined angle and in intersecting relation, said work-engaging portion being provided with a semi-cylindrical outer surface centered at the intersection of said second-mentioned first and second supporting surfaces, whereby said semi-cylindrical outer surface is concentric with the center of said plate when said arbor is supported by said base with said pairs of first and second supporting surfaces in respective engagement, and means carried by said plate and adapted to engage a test specimen carried by said body portion for detachably clamping the test specimen and said arbor to said base.

GODFREY STANIUS.

REFERENCES CITED

The following references are of record in the file of this patent:

UNITED STATES PATENTS

| Number | Name | Date |
|---|---|---|
| 1,573,865 | Robbins | Feb. 23, 1926 |
| 1,703,928 | Gastrich | Mar. 5, 1929 |
| 1,786,138 | Sunderland | Dec. 23, 1930 |
| 2,030,418 | Warner | Feb. 11, 1936 |
| 2,049,235 | Tour et al. | July 28, 1936 |
| 2,060,834 | Stitz | Nov. 17, 1936 |
| 2,063,275 | Taber | Dec. 8, 1936 |
| 2,093,497 | Walker | Sept. 21, 1937 |
| 2,426,583 | Bailey | Sept. 2, 1947 |

FOREIGN PATENTS

| Number | Country | Date |
|---|---|---|
| 185,253 | Great Britain | Sept. 7, 1922 |